United States Patent
Hutchinson

(10) Patent No.: US 10,446,181 B1
(45) Date of Patent: Oct. 15, 2019

(54) TEMPERATURE CONTROL IN A TRANSDUCING HEAD

(71) Applicant: Seagate Technology LLC, Cupertino, CA (US)

(72) Inventor: Erik J. Hutchinson, Eden Prairie, MN (US)

(73) Assignee: SEAGATE TECHNOLOGY LLC, Cupertino, CA (US)

( * ) Notice: Subject to any disclaimer, the term of this patent is extended or adjusted under 35 U.S.C. 154(b) by 0 days.

(21) Appl. No.: 15/901,592

(22) Filed: Feb. 21, 2018

(51) Int. Cl.
| | |
|---|---|
| G11B 5/33 | (2006.01) |
| G11B 5/60 | (2006.01) |
| G11B 5/11 | (2006.01) |
| G11B 5/31 | (2006.01) |
| G11B 5/00 | (2006.01) |

(52) U.S. Cl.
CPC ............ *G11B 5/607* (2013.01); *G11B 5/11* (2013.01); *G11B 5/3133* (2013.01); *G11B 5/3143* (2013.01); *G11B 5/3163* (2013.01); *G11B 5/332* (2013.01); *G11B 5/6082* (2013.01); *G11B 2005/0021* (2013.01)

(58) Field of Classification Search
CPC ..... G11B 5/3133; G11B 5/314; G11B 5/3143; G11B 5/3163; G11B 5/332; G11B 5/607
USPC ............ 360/294.7, 110, 319, 125.3, 125.31, 360/125.32, 125.74, 125.75
See application file for complete search history.

(56) References Cited

U.S. PATENT DOCUMENTS

| | | | |
|---|---|---|---|
| 6,963,464 B2 | 11/2005 | Xu et al. | |
| 6,975,472 B2 | 12/2005 | Stover et al. | |
| 7,430,098 B1* | 9/2008 | Song | G11B 5/1278 360/294.7 |
| 7,649,713 B2* | 1/2010 | Ota | G11B 5/3133 360/125.32 |
| 7,660,080 B1* | 2/2010 | Liu | G11B 5/3133 360/128 |
| 7,729,087 B1* | 6/2010 | Stoev | G11B 5/3133 360/125.74 |
| 7,974,046 B2* | 7/2011 | Ota | G11B 5/102 360/125.31 |
| 8,817,425 B1* | 8/2014 | Wu | G11B 5/3133 360/125.32 |
| 8,929,016 B2* | 1/2015 | Gao | G11B 13/08 360/234.4 |
| 9,202,490 B2 | 12/2015 | Zuckerman et al. | |
| 9,275,663 B2 | 3/2016 | Hur et al. | |

(Continued)

*Primary Examiner* — Jefferson A Evans
(74) *Attorney, Agent, or Firm* — Westman, Champlin & Koehler, P.A.

(57) ABSTRACT

A transducing head having a media-facing surface includes a transducer element, a bottom shield positioned below the transducer element, a heater element positioned below the bottom shield, a heat transfer block positioned below the heater element, and a push block assembly. A first portion of the push block assembly is positioned below a bottom edge of the bottom shield, and a second portion of the push block assembly is located behind the bottom shield relative to the media-facing surface of the transducing head and extends above the bottom edge of the bottom shield, with the first and second portions of the push block assembly spaced from each other. The second portion of the push block assembly overlaps the heater element, and the heater element is positioned between the heat transfer block and at least the second portion of the push block assembly.

19 Claims, 6 Drawing Sheets

(56) References Cited

U.S. PATENT DOCUMENTS

| | | | |
|---|---|---|---|
| 9,324,351 B2 | 4/2016 | Kong et al. | |
| 9,536,554 B2 | 1/2017 | Zuckerman et al. | |
| 2008/0030905 A1* | 2/2008 | Yamanaka | G11B 5/1278 360/313 |
| 2010/0309581 A1* | 12/2010 | Wu | G11B 5/1278 360/123.12 |
| 2011/0267715 A1* | 11/2011 | Heim | G11B 5/3133 360/59 |
| 2015/0162039 A1* | 6/2015 | Wolf | G11B 5/6064 360/75 |

* cited by examiner

TEMPERATURE CONTROL IN A TRANSDUCING HEAD

SUMMARY

In one aspect, a transducing head having a media-facing surface includes a transducer element, a bottom shield positioned below the transducer element, a heater element positioned below the bottom shield, a heat transfer block positioned below the heater element, and a push block assembly. A first portion of the push block assembly is positioned below a bottom edge of the bottom shield, and a second portion of the push block assembly is located behind the bottom shield relative to the media-facing surface of the transducing head and extends above the bottom edge of the bottom shield, with the first and second portions of the push block assembly spaced from each other. The second portion of the push block assembly overlaps the heater element, and the heater element is positioned between the heat transfer block and at least the second portion of the push block assembly.

In another aspect, a transducing head having a media-facing surface includes a reader element, a bottom reader shield positioned below the reader element, a reader heater positioned below the bottom reader shield and having a loop shape, a heat transfer block positioned below the reader heater, and a push block assembly. A first portion of the push block assembly is located below a bottom edge of the bottom reader shield, and a second portion of the push block assembly is located behind the bottom reader shield relative to the media-facing surface and extends above the bottom edge of the bottom reader shield. The push block assembly is arranged in between the bottom reader shield and the reader heater, and the second portion of the push block assembly is at least partially flared.

In yet another aspect, a method of reading stored data includes applying a current to a heater element to generate heat, cooling the heater element with a heater block positioned below the heater element, absorbing heat from the heater element with a push block located on an opposite side of the heater element from the heater block, mechanically urging the push block toward a media-facing surface as a function of a shape of the push block and thermal expansion resulting from the heat absorbed from the heater element such that a portion of the push block pushes toward a reader shield, and reading stored data from a storage medium with a reader located on an opposite side of the reader shield from the heater element. The push block has lower thermal conductivity than the heater block.

These aspects of the present disclosure are described merely by way of example and not limitation. Other features and benefits that characterize embodiments of the present disclosure will be apparent upon reading the following detailed description and review of the associated drawings.

Figure 1:
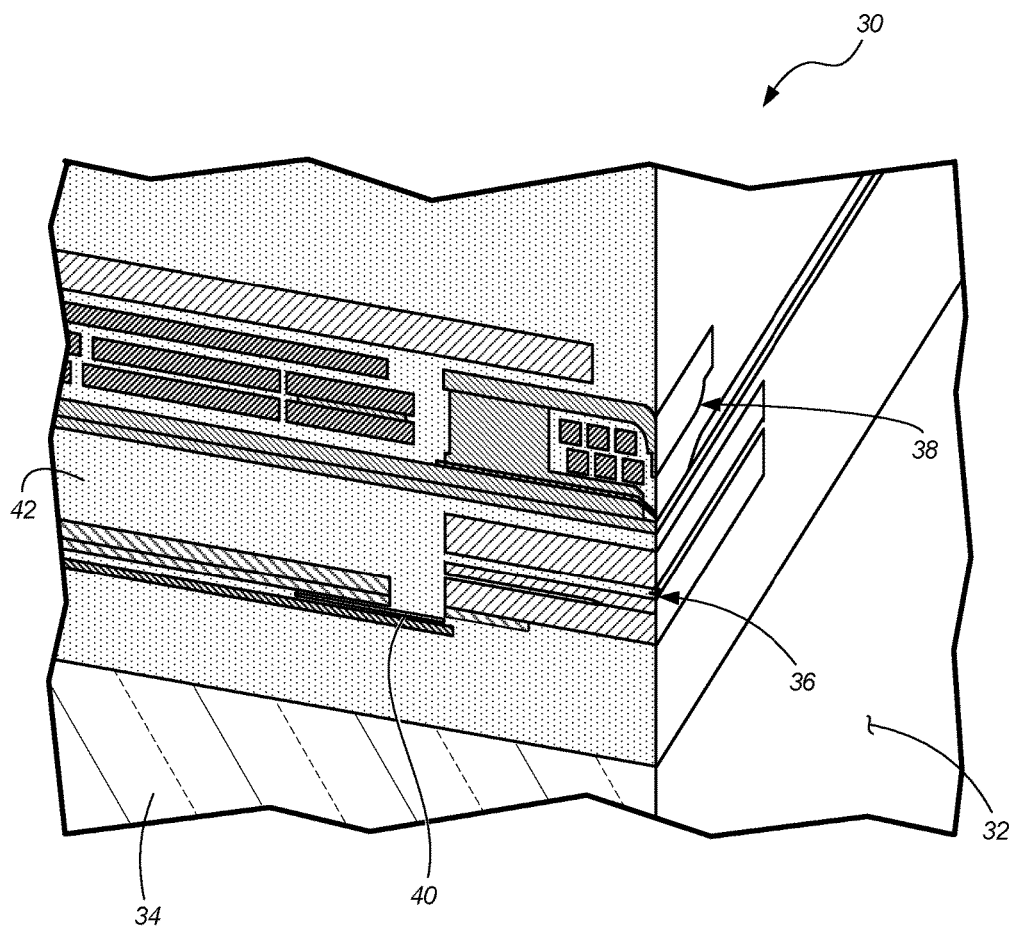
FIG. 1 is a perspective, cross-sectional view of an embodiment of a transducing head.

While the above-identified figures set forth one or more embodiments of the present disclosure, other embodiments are also contemplated, as noted in the discussion. In all cases, this disclosure presents the disclosure by way of representation and not limitation. It should be understood that numerous other modifications and embodiments can be devised by those skilled in the art, which fall within the scope and spirit of the principles of the disclosure. The figures may not be drawn to scale, and applications and embodiments of the present disclosure may include features, steps and/or components not specifically shown in the drawings.

DETAILED DESCRIPTION OF ILLUSTRATIVE EMBODIMENTS

Data storage systems commonly have a recording head that includes a read transducer that reads information from a data storage medium and a write transducer that writes information to a data storage medium. Recording heads may also include other components such as a heater that is utilized to actuate, for example, the read transducer and/or the write transducer. Spacing of the recording head from the storage medium affects the strength of the read signal and the strength of the write signal. To achieve higher recording densities, the head is positioned closer to the medium, which decreases a head-medium spacing or fly height. A rate at which transducers are actuated (e.g., by a heater) is referred to as the stroke. The decreased fly height increases the propensity of the head to collide with asperities or particles on the medium and thereby increases the propensity for damage to the read transducer and the write transducer. However, in heat-assisted magnetic recording (HAMR) applications a passive fly height may be increased, with a corresponding emphasis on transducer actuation to decrease the spacing between a given transducer and the data storage medium during a reading or writing operation.

In general, the present disclosure provides temperature control within a transducing head while still permitting relatively high stroke performance when actuating a given transducer of the transducing head (e.g., using a heater). Magnetic data storage systems, such as those using heat-assisted magnetic recording (HAMR), often utilize one or more heaters to actuate a transducer, such as a reader element, to actuate that transducer to adjust transducer-to-storage medium spacing. Transducer actuation (e.g., by a heater) is causes movement of the transducer and is referred to as stroke. Stroke efficiency can be quantified by a measure of actuation distance over actuation power input (e.g., A/mW for an electrically resistive heater). It is generally desired to have relatively high stroke efficiency, as well as relatively fast stroke actuation. It is further helpful to permit sufficient stroke distances (e.g., heat induced transducer protrusion) to be able to achieve desired transducer-to-storage medium spacing targets. These transducer stroke and actuation constraints are most easily promoted by increased heating. However, transducers are typically sensitive to high temperatures, and it is desired to avoid relatively high operating temperatures at the transducer. For that reason, some conventional transducing heads utilize a "thermal cage" to insulate the transducer from the heater. Moreover, cooling structures can be provided that draw away heat from the transducer. But these objectives represented tradeoffs, in that providing more heat to promote stroke and actuation tended to jeopardize transducer thermal integrity (including transducer lifespan), while cooling or insulating the transducer to limit transducer operating temperatures tended to limit stroke and actuation performance. In particular, those conventional solutions tend to place the heater closer to an air-bearing surface (ABS) and the transducer, which tends to allow the transducer's temperature to rise quickly and potentially excessively, despite the presence of insulation or cooling structures. The presently disclosed embodiments allow the conventional tradeoff to be overcome, allowing stroke to be increased while simultaneously allowing lower transducer operating temperatures. These and other features and benefits will be recognized by those of ordinary skill in the art in view of the entirety of the present disclosure, including the accompanying figures.

Hard disc drives are a common type of data storage system. The embodiments of the transducing head described herein can be used with a disc drive. However, other types of data storage systems should be considered within the scope of the present disclosure.

FIG. 1 is a perspective, cross-sectional view of an embodiment of a transducing head 30 with a media-facing surface 32, with the section plane taken normal to the media-facing surface 32. The transducing head 30 includes a substrate 34, a reader 36, a writer 38 and a heater 40. In alternate embodiments, one or more additional transducers can be provided, for example, an additional reader. The substrate 34 can be formed of a ceramic material, such as AlTiC, or other suitable materials. The reader 36 and the writer 38 can be transducers capable of reading and writing, respectively, information from or to a magnetic storage medium, such as using heat-assisted magnetic recording (HAMR) techniques. The particular configuration of the reader 36 and the writer 38 can vary as desired for particular applications. The heater 40 is positioned proximate to the reader 36, and can generate thermal energy when provided with electrical current. An electrically insulative material 42, such as an electrically insulative ceramic material like $Al_2O_3$, can be provided around the reader 36, the writer 38, the heater 40, and other components to support them on the substrate 34.

The storage medium can be configured with discrete tracks that storage data. Thus, the transducing head 30 can be described relative to a downtrack direction indicated by arrow 44 and a cross-track direction indicated by arrow 46, which is arranged normal to arrow 44.

It should be noted that the configuration of the transducing head 30 is shown and described merely by way of example and not limitation. For instance, other configurations of the reader 36 and the writer 38 are possible, and relative positioning and spacing between certain components can vary as desired for particular applications. Moreover, although not specifically discussed above, the transducing head 30 can include one or more media-heating elements for HAMR applications.

Figure 2:
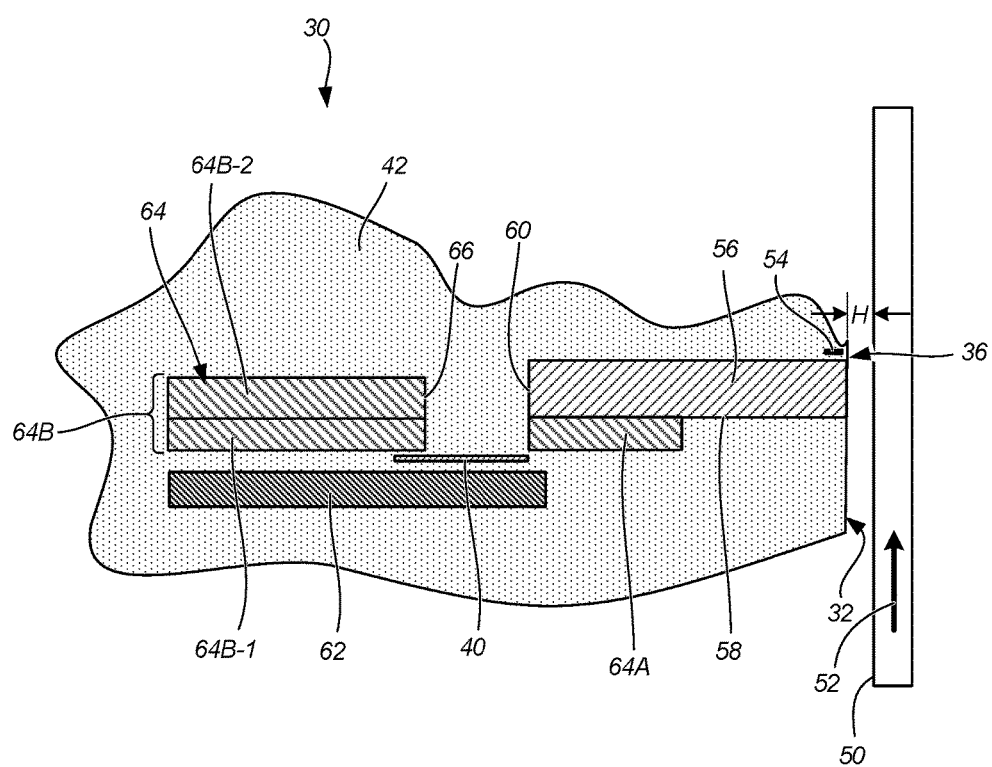
FIG. 2 is a cross-sectional schematic view of a portion of the transducing head adjacent to a storage medium.

FIG. 2 is a cross-sectional schematic view of a portion of the transducing head 30 adjacent to a storage medium 50. The sectional plane of FIG. 2 corresponds to the sectional plane of FIG. 1. Relative movement between the transducing head 30 and the storage medium is indicated by arrow 52, which corresponds to the downtrack direction 44.

The reader 36 of the illustrated embodiment includes a read element 54 and a bottom shield 56 (or bottom reader shield) positioned below the read element 54. A top shield (not shown in FIG. 2) also can be provided at an opposite side of the read element 54 from the bottom shield 60, that is, above the read element 54. The bottom shield 56 has a bottom edge 58 and a rear edge 60. The bottom edge 58 can face the substrate 34 (see FIG. 1) with the rear edge 60 located away from the media-facing surface 32. In one embodiment, the bottom edge can be approximately 6.5 µm above the substrate 34. During operation, the read element 54 can read information stored in the storage medium 50. The read element 54 is typically heat-sensitive, and it is desirable to limit read element operating temperatures to relatively low temperatures.

The heater 40 is located below the bottom shield 56. In the illustrated embodiment, the heater 40 is mostly or entirely positioned behind the rear edge 60 of the bottom shield 56, although it should be noted that only a portion of the heater 40 is visible in the sectional view of FIG. 2. The heater 40 can be positioned approximately 9.0 to 10.0 µm from the media-facing surface 32, in some embodiments. The heater 40 can be an electrically resistive heater element that generates thermal energy when supplied with an electrical current. Suitable materials for the heater 40 include NiCr and tungsten (W). Possible configurations of the heater 40 are discussed further below.

A heat transfer block 62 is located below the heater 40. In one embodiment, the heat transfer block 62 is made of a material with a relatively high thermal conductivity, such as copper (Cu) or another material with a thermal conductivity greater than or equal to 100 W/mK. The heat transfer block 62 can have a thickness of approximately 0.5 µm, can be positioned approximately 9.5 to 8.5 µm from the media-facing surface 32, and can be spaced from the heater 40 by approximately 0.225 µm, in some embodiments. The heat transfer block 62 can extend closer to the media-facing surface 32 than the heater 40, for instance, approximately 0.5 µm closer. In some embodiments, a single heat transfer block 62 can be provided, while in further embodiments multiple heat transfer blocks 62 can be utilized, as discussed further below.

A push block assembly 64 is also provided above the heater 40, such that the heater 40 is located in between the heat transfer block 62 and the push block assembly 64 in the downtrack direction 44. The push block assembly 64 can be made of a material with moderate thermal conductivity (e.g., less than the thermal conductivity of material of the heat transfer block 62) and a moderate coefficient of thermal expansion, such as NiCu. In this respect, the push block assembly 64 can be made from a different material than the heat transfer block 62. The push block assembly 64 can include a first portion (or first push block) 64A and a second portion (or second push block) 64B. The first portion 64A is located below the bottom edge 58 of the bottom shield 56, and can directly adjoin and physically contact the bottom shield 56. A front edge of the first portion 64A can be spaced from the media-facing surface 32 (e.g., by approximately 6 µm), and a rear edge of the first portion 64A can be substantially aligned with the rear edge 60 of the bottom shield 56. The first portion 64A can be electrically connected to reader leads (not shown). The second portion 64B is located behind the rear edge 60 of the bottom shield, and extends from below the bottom edge 58 to above the bottom edge 58. A front edge 66 of the second portion 64B is spaced from the first portion 64A and the rear edge 60 of the bottom shield 56 by a small distance, such as approximately 2.5 µm. Such spacing of the second portion 64B from the bottom shield 56 and the first portion 64A helps limit the transmission of thermal energy to the read element 54. In the illustrated embodiment, the second portion 64B includes a first part 64B-1 and a second part 64B-2. The first part 64B-1 is located below the bottom edge 58 of the bottom shield 56, while the second part 64B-2 is located above the bottom edge 58. The two parts 64B-1 and 64B-2 can adjoin one another and physically contact one another, but can be deposited separately to facilitate fabrication of the bottom shield 56. In alternate embodiments the second portion 64B could be an integral and monolithic structure.

The first portion 64A of the push block assembly 64 can have a thickness of approximately 0.5 to 1.0 μm in some embodiments. The first part 64B-1 of the second portion 64B can have a thickness substantially equal to that of the first portion 64A, and the second part 64B-2 of the second portion 64B can have a thickness less than a thickness of the bottom shield 56. Additionally, a total thickness of the second portion 64B, including the first and second parts 64B-1 and 64B-2, can be greater than the thickness of the heat transfer block 62 and the bottom shield 56. In further embodiments, the total thickness of the second portion 64B can be approximately 1.5 μm, and the thickness of the second part 64B-2 can be the difference between 1.5 μm and the thickness of the first part 64B-1 (which can be equal to the thickness of the first portion 64A). The thickness of the first portion 64A of the push block assembly 64 can be selected to support a desired tradeoff between stroke efficiency and a rate of temperature rise in the read element 54. The push block assembly 64 can be spaced from the heater 40 by approximately 0.225 μm, in some embodiments. Additional aspects of the shape of portions of the push block assembly 64 are discussed further below.

As previously noted, the electrically insulative material 42 (e.g., $Al_2O_3$) can be provided in between components of the transducing head 30. For instance, the material 42 can fill spaces between the heater 40 and the heat transfer block 62, the heater 40 and the push block assembly 64, and between the second portion 64B of the push block assembly 64 and both the first portion 64A and the bottom shield 56. The material 42 can have a relatively low thermal conductivity and be relatively rigid, which impacts transducer actuation and stroke performance.

The transducing head 30 can be positioned adjacent to the storage medium 50, such that the media-facing surface 32 can fly above the storage medium 50 during operation. In this respect, the media-facing surface 32 can act as an ABS that allows the transducing head 30 to fly above the storage medium 50 on a cushion of air (or other suitable fluid, such as helium) at a passive fly height H. However, because transducing operations can experience decreased read/write signal strengths with increased passive fly height (or increased head-medium spacing) H, the heater 40 can be used to influence heat-induced transducer protrusion at the media-facing surface 32, with the protrusion movement of the affected transducer(s) referred to as stroke or actuation. In this respect, heat generated by the heater 40 can produce protrusion of the reader 36 (including the read element 54, the bottom shield 56, and a top shield (not shown in FIG. 2)) for a read operation. Protrusion can occur due to thermal expansion caused by heat generated with the heater 40. In general, control of transducer stroke allows relatively precise positioning and transducer-medium spacing for a read or write operation, by facilitating temporary, local adjustments of transducer-medium spacing relative to passive fly height H of the transducing head 30 as a whole. Moreover, a close point along the media-facing surface 32 of the transducing head 30 during a read operation should be at or near the read element 54 to promote read signal strength. Furthermore, the transducing head 30 may contact the storage medium 50, and control of transducer stroke can help regulate such head-medium contact events. However, as already mentioned, the read element 54 may be heat-sensitive, and it is further desired to limit the temperature of the read element 54.

When the heater 40 generates thermal energy during operation of the transducing head 30, to provide actuation, at least some of that thermal energy can be absorbed by the heat transfer block 62, which acts to cool the heater 40. Some of the thermal energy generated by the heater 40 then rebounds or reflects from the heat transfer block 62 and passes to the push block assembly 64. Heating of the push block assembly 64 causes thermal expansion that promotes protrusion along the media-facing surface 32 toward the storage medium 50 (e.g., actuation). Such thermal expansion causes the second portion 64B of the push block assembly 64 to push against the first portion 64A and the bottom shield 56, thereby promoting protrusion with good stroke efficiency but without transmitting an undesired amount of thermal energy to the read element 54. As explained further below, the shape of portions of the push block assembly 64 can provide a thermo-mechanical mechanism to promote directional thermal expansion toward the media-facing surface 32. Such directional thermal expansion facilitates good stroke efficiency by converting more thermal energy from the heater 40 into useful mechanical work for purposes of stroke and actuation. Additionally, the presence of the first portion 64A of the push block assembly 64 helps to gather or collect a suitable amount of thermal energy below the bottom shield 56, to promote a close point of the head 30 near the read element 54 during actuation, as well as to help equalize a thickness of what the second portion 64B pushes against during thermal expansion.

Figure 3A:
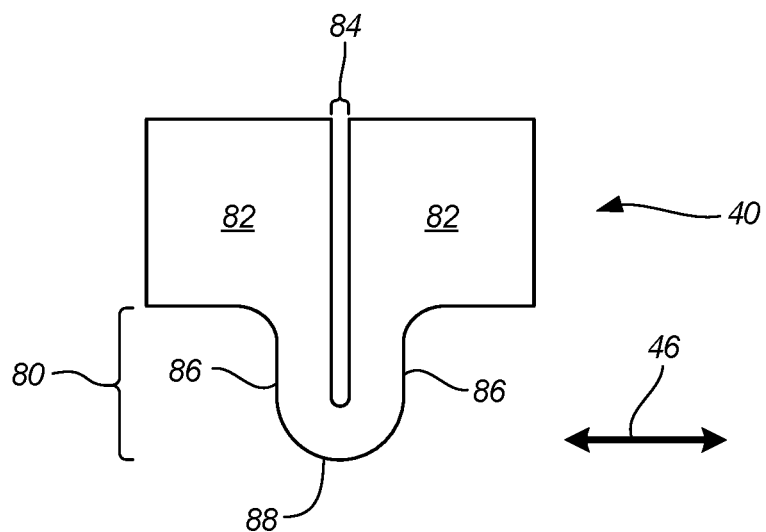
FIG. 3A is an elevation view of one embodiment of a heater, shown in isolation.

FIG. 3A is an elevation view of one embodiment of the heater 40, shown in isolation. The view shown in FIG. 3A is from the media-facing surface 32, that is, perpendicular to the section planes of FIGS. 1 and 2. The heater 40 includes a heater element 80 and electrical connection pads 82. The heater element 80 can have an arcuate or semi-obround single loop shape in the cross-track direction 46, with a small gap 84 between opposing sides of the heater element 80. The gap 84 can be substantially linear and the opposing sides 86 of the heater element 80 can be substantially parallel in some embodiments. Fillets can optionally be provided where the sides 86 meet the pads 82. A media-facing end 88 of the heater element 80 located opposite the pads 82 can be rounded, and can connect the opposing sides 86 and bridge the gap 84. An overall aspect ratio of the heater element 80 can be established such that a width in the cross-track direction 46 is less than a length, giving the reader element an elongate shape. The relatively small cross-track width of the heater element 80 still provides a sufficiently wide electrical pathway so that the heater 40 does not risk premature failure due to electro-migration. The embodiment of FIG. 3A helps to flatten a cross-track profile of heat-induced transducer protrusion, which is beneficial in multi-transducer (e.g., multi-reader) heads.

Figure 3B:
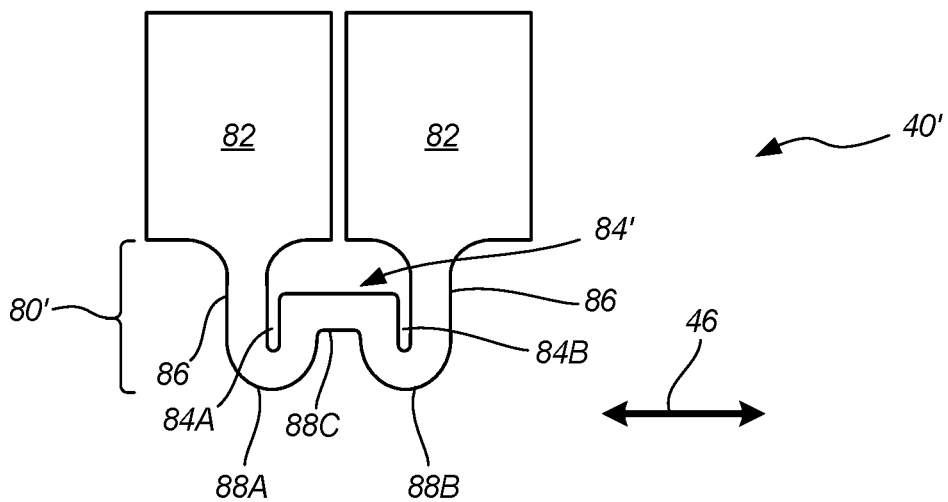
FIG. 3B is an elevation view of another embodiment of a heater, shown in isolation.

FIG. 3B is an elevation view of another embodiment of a heater 40', shown in isolation. The heater 40' is generally similar to the heater 40 described above. However, a heater element 80' of the heater 40' has a double loop shape in the cross-track direction 46. As shown in FIG. 3B, the heater element 80' has opposite sides 86 that are generally parallel to each other and are separated by a gap 84'. A media-facing end of the heater element 80' includes arcuate or rounded first and second portions 88A and 88B that are spaced from each other and are electrically connected in series by bridge portion 88C. The bridge portion 88C can be substantially linear, and can be arranged substantially perpendicular to the sides 86. Furthermore, the bridge portion 88C can be located at a middle portion of the sides 86, recessed from distal, media-facing points of the rounded first and second portions 88A and 88B. The double loop shape with the first and second portions 88A and 88B allows a contact area between the heater 40' and a storage medium (e.g., medium 50) to be relatively large during an actuation or protrusion event, because there are two points of contact.

It should be noted that the embodiments of the heaters 40 and 40' shown in FIGS. 3A and 3B and described above are disclosed merely by way of example and not limitation. Other configurations are possible, including variations in dimensions, shape, and combinations of shape and dimensions are possible in further embodiments (e.g., with one or more additional loops). For instance, a further multiple loop embodiment of the heater is possible with the loops electrically connected in parallel, to limit current draw. A double loop in series might raiser heater resistance beyond current limits of a pre-amp driver, and a parallel electrical connect can lower heater electrical resistance without sacrificing performance. Moreover, in still further embodiments a flat bar heater shape can be used.

Figure 4A:
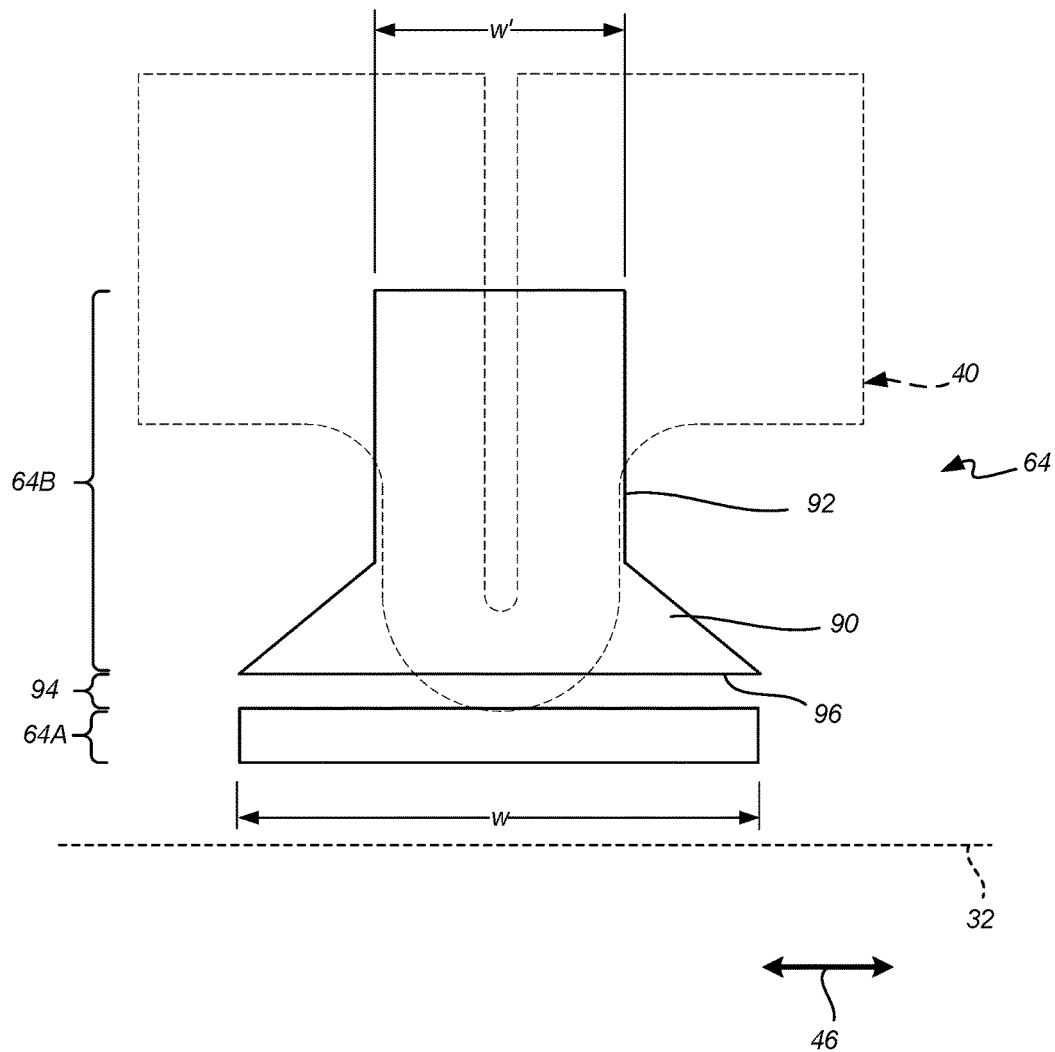
FIG. 4A is an elevation view of an embodiment of a push block assembly.

FIG. 4A is an elevation view of an embodiment of the push block assembly 64, with the heater 40 shown in phantom. For reference purposes the media-facing surface 32 is indicated by a dashed line. Aside from the depictions of the relative positioning the heater 40 and the media-facing surface 32, the push block assembly 64 is shown in isolation in FIG. 4A. In the illustrated embodiment, the first portion 64A of the push block assembly 64 has a rectangular perimeter shape with a low aspect ratio such that a width W in the cross-track direction 46 is greater than a corresponding length.

Furthermore, in the embodiment illustrated in FIG. 4A the second portion 64B includes a flared segment 90 and an additional, unflared segment 92. The flared segment 90 is located adjacent to the first portion 64A, separated by a gap 94 (e.g., filled by the material 42), and toward the media-facing surface 32. At least part of the flared segment 90 is also located adjacent to the bottom shield 56 (not shown in FIG. 4A). The additional, unflared segment 92 can be generally rectangular. The flared segment 90 has a wider end 96 facing the first portion 64A and the media-facing surface 32. The wider end 96 can have a width W equal to that of the first portion 64A, while the additional, unflared segment can have a width W' that is smaller. In the illustrated embodiment, the perimeter of the second portion 64B has a polygonal shape, with the flared segment 90 widening from the additional, unflared portion 94 at an obtuse angle of intersection, and resembling a Y-shape or trumpet shape. However, in further embodiments other types of flared shapes are possible, such as an arcuate, curved or step-wise flare, as well as flares in other directions (e.g., flares produced by thickness variations). Furthermore, the flared segment 90 can include a constant- or narrower-width sub-segment in some embodiments, such as adjacent to the first portion 64A. In other words, the widening portion of the flared segment 90 need not be closest to the first portion 64A and the gap 94. The gap 94 can help limit thermal conduction to the bottom shield 56, and thereby help limit thermal conduction to the read element 54. And yet the gap 94 should not be too large, or stroke efficiency may decrease undesirably.

The push block assembly 64 can be sized and shaped in relation to the heater element 80 or 80', at least in part. For example, the push block assembly 64 can overlap the heater element 80 or 80' and mimic the overall shape of the heater element 80 or 80', with the push block assembly 64 being wider by a small amount, such as by approximately 0.5 µm.

When the second portion 64B of the push block assembly 64 is heated, thermal expansion occurs. The coefficient of thermal expansion of material of the push block assembly 64 (e.g., NiCu) is greater than that of the surrounding material 42 (e.g., $Al_2O_3$). The shape of the second portion 64B, particularly the perimeter shape and the presence of the flared segment 90, thermo-mechanically induces movement of second portion 64B in a particular direction, namely toward the first portion 64A, the bottom shield 56 (not shown in FIG. 4A), and the media-facing surface 32. Such directional thermal expansion of the second portion 64B promotes stroke efficiency, allowing actuation of the bottom shield 56 (and the reader element 54) with less thermal energy output of the heater 40, and with less heat absorption by the reader element 54.

Figure 4B:
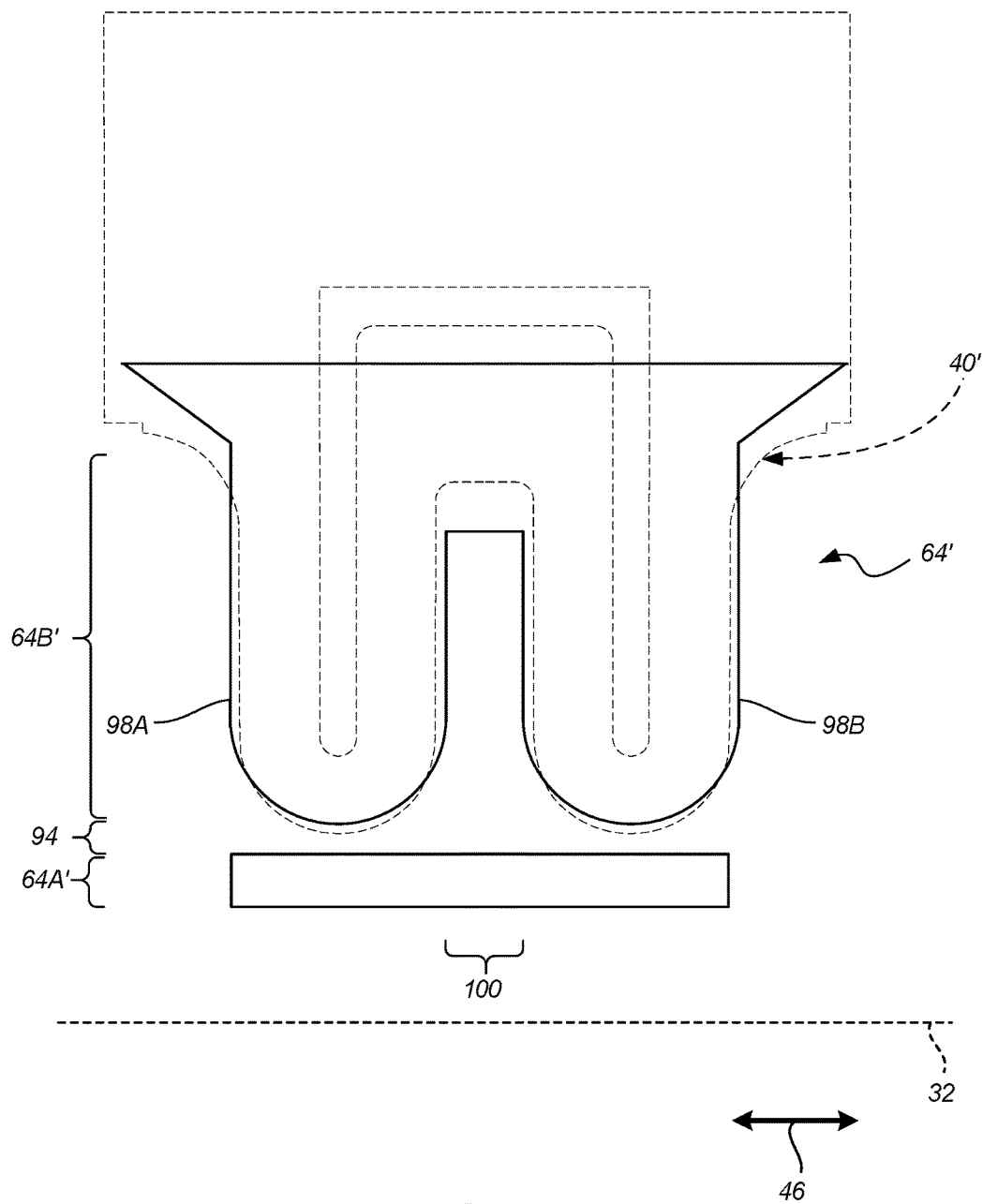
FIG. 4B is an elevation view of another embodiment of a push block assembly.

FIG. 4B is an elevation view of another embodiment of a push block assembly 64', for use with a heater 40' with a double-loop configuration (similar, but not identical, to the heater 40' shown in FIG. 3B) shown in phantom. In the illustrated embodiment, the push block assembly 64' includes a first portion 64A' and a second portion 64B' separated by a gap 94. The second portion 64B' includes a first loop segment 98A and a second loop segment 98B, separated in the cross-track direction by a gap 100. The first and second loop segments 98A and 98B can overlap the heater 40' while the gap 100 can be positioned in between loops of the heater 40'. The gap 100 can promote directional thermo-mechanical movement toward the media-facing surface 32 when the heater 40' produces thermal energy for a protrusion event. The first and second loop segments 98A and 98B are unflared in the illustrated embodiment, but could be flared in further embodiments.

Figure 5:
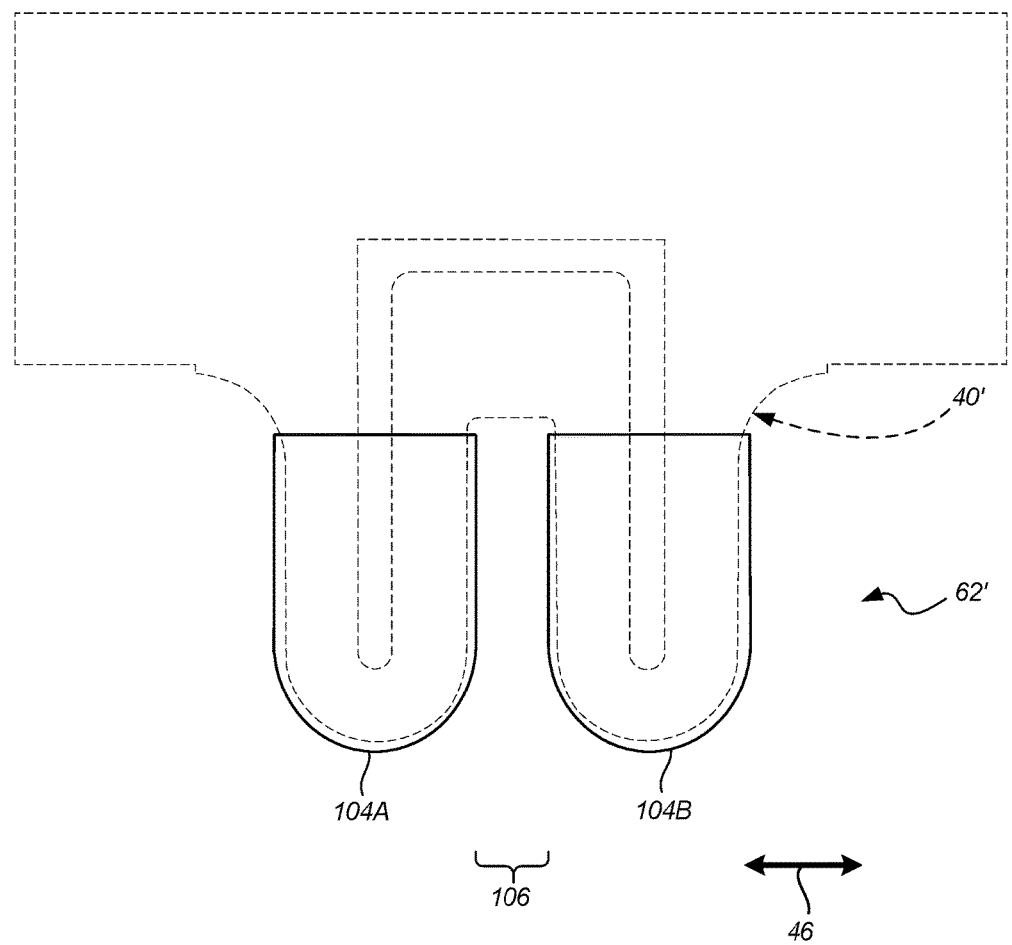
FIG. 5 is an elevation view of an embodiment of a heat transfer block assembly.

FIG. 5 is an elevation view of an embodiment of a heat transfer block assembly 62', for use with a heater 40' with a double-loop configuration (similar, but not identical, to the heater 40' shown in FIG. 3B) shown in phantom. In the illustrated embodiment, the heat transfer block assembly 62' includes a first portion (or first block) 104A and a second portion (or second block) 104B separated in the cross-track direction by a gap 106. The first and second portions 104A and 104B can be arranged to overlap with loops of the heater 40', with the gap 106 located in between loops of the heater 40'. Edges of the first and second portions 104A and 104B can be rounded to mimic a shape of the loops of the heater 40'.

It has been found that embodiments of the present disclosure provide numerous performance benefits and advantages over conventional designs. For example, heater-induced reader protrusion (e.g., stroke) increased by 7% for the single loop heater 40 and by 14% for the double loop heater 40' over a conventional "thermal cage" transducing head, and reader element temperature rise was only 81% for the single loop heater 40 and only 85% for the double loop heater 40'. Further, for the double loop heater 40' the minimum contact area increased by 32% over the conventional "thermal cage" design.

While certain components and structures have been described using terms such as above, below, behind, and the like, such terms are used in a relative sense, in order to describe the positions and orientations of such objects in relation to each other. It should be understood that the components and structures described in such a manner can be located within a system that, as a whole, may be oriented or positioned different ways. Moreover, any relative terms or terms of degree used herein, such as "substantially", "essentially", "generally", "approximately" and the like, should be interpreted in accordance with and subject to any applicable definitions or limits expressly stated herein. In all instances, any relative terms or terms of degree used herein should be interpreted to broadly encompass any relevant disclosed embodiments as well as such ranges or variations as would be understood by a person of ordinary skill in the art in view of the entirety of the present disclosure, such as to encompass ordinary manufacturing tolerance variations, incidental alignment variations, transient alignment or shape variations induced by thermal, rotational or vibrational operational conditions, transitory signal fluctuations, and the like. Moreover, any relative terms or terms of degree used herein should be interpreted to encompass a range that expressly includes the designated quality, characteristic, parameter or value, without variation, as if no qualifying relative term or term of degree were utilized in the given disclosure or recitation.

It is to be understood that even though numerous characteristics and advantages of various embodiments of the disclosure have been set forth in the foregoing description, together with details of the structure and function of various embodiments, this disclosure is illustrative only, and changes may be made in detail, especially in matters of structure and arrangement of parts within the principles of the present disclosure to the full extent indicated by the broad general meaning of the terms in which the appended claims are expressed. For example, the particular elements may vary depending on the particular application for the transducing system while maintaining substantially the same functionality without departing from the scope and spirit of the present disclosure.

What is claimed is:

1. A transducing head comprising:
a media-facing surface;
a transducer element;
a bottom shield positioned below the transducer element;
a heater element positioned below the bottom shield;
a heat transfer block positioned below the heater element; and
a push block assembly, wherein a first portion of the push block assembly is positioned below a bottom edge of the bottom shield, wherein a second portion of the push block assembly is located behind the bottom shield relative to the media-facing surface of the transducing head and extends above the bottom edge of the bottom shield, wherein the first and second portions of the push block assembly are spaced from each other, wherein the second portion of the push block assembly overlaps the heater element, and wherein the heater element is positioned between the heat transfer block and at least the second portion of the push block assembly.

2. The transducing head of claim 1, wherein the push block assembly comprises NiCu.

3. The transducing head of claim 2, wherein the heat transfer block consists essentially of Cu.

4. The transducing head of claim 1, wherein the heater element has a loop shape.

5. The transducing head of claim 1, wherein the heater element has a double loop shape in a cross-track direction.

6. The transducing head of claim 1, wherein the second portion of the push block assembly is at least partially flared.

7. The transducing head of claim 6, wherein the second portion of the push block assembly is flared so as to widen in a cross-track direction.

8. The transducing head of claim 1, wherein the second portion of the push block assembly includes an unflared segment and a flared segment, wherein the flared segment includes a wider end located away from the unflared segment, and wherein the wider end of the flared segment is arranged toward the media-facing surface.

9. The transducing head of claim 8, wherein the first portion of the push block assembly has a cross-track width substantially equal to a width of the wider end of the flared segment of the second portion.

10. The transducing head of claim 8, wherein the unflared segment of the second portion of the push block assembly has a width at least as great as an overall width of the heater element.

11. The transducing head of claim 1 and further comprising:
an electrically insulating ceramic material positioned adjacent to the heater element, the heat transfer block, and the push block assembly.

12. The transducing head of claim 11, wherein the first and second portions of the push block assembly are separated by the electrically insulating ceramic material.

13. The transducing head of claim 1, wherein the push block assembly comprises a material with a lower thermal conductivity than a material of the heat transfer block.

14. A transducing head comprising:
a media-facing surface;
a reader element;
a bottom reader shield positioned below the reader element;
a reader heater positioned below the bottom reader shield, the reader heater having a loop shape;
a heat transfer block positioned below the reader heater; and
a push block assembly, wherein a first portion of the push block assembly is located below a bottom edge of the bottom reader shield, wherein a second portion of the push block assembly is located behind the bottom reader shield relative to the media-facing surface and extends above the bottom edge of the bottom reader shield, wherein the push block assembly is arranged in between the bottom reader shield and the reader heater, and wherein the second portion of the push block assembly is at least partially flared.

15. The transducing head of claim 14, wherein the push block assembly comprises NiCu.

16. The transducing head of claim 14, wherein the reader heater has a first arcuate portion and a second arcuate portion.

17. The transducing head of claim 14, wherein the second portion of the push block assembly includes an unflared segment and a flared segment, wherein the flared segment includes a wider end arranged toward the media-facing surface, wherein the first portion of the push block assembly has a cross-track width substantially equal to a width of the wider end of the flared segment of the second portion, and wherein the unflared segment of the second portion has a width at least as great as an overall width of the reader heater.

18. The transducing head of claim 14 and further comprising:
a heat transfer block positioned below the reader heater, such that the reader heater is positioned between the heat transfer block and at least the second portion of the push block assembly.

19. The transducing head of claim 18, wherein the push block assembly is made of a material with a lower thermal conductivity than a material of the heat transfer block.

\* \* \* \* \*